Oct. 25, 1949.　　　R. E. JENNINGS ET AL　　　2,486,163
DIP NET
Filed Feb. 6, 1948　　　　　　　　　　　　2 Sheets-Sheet 1
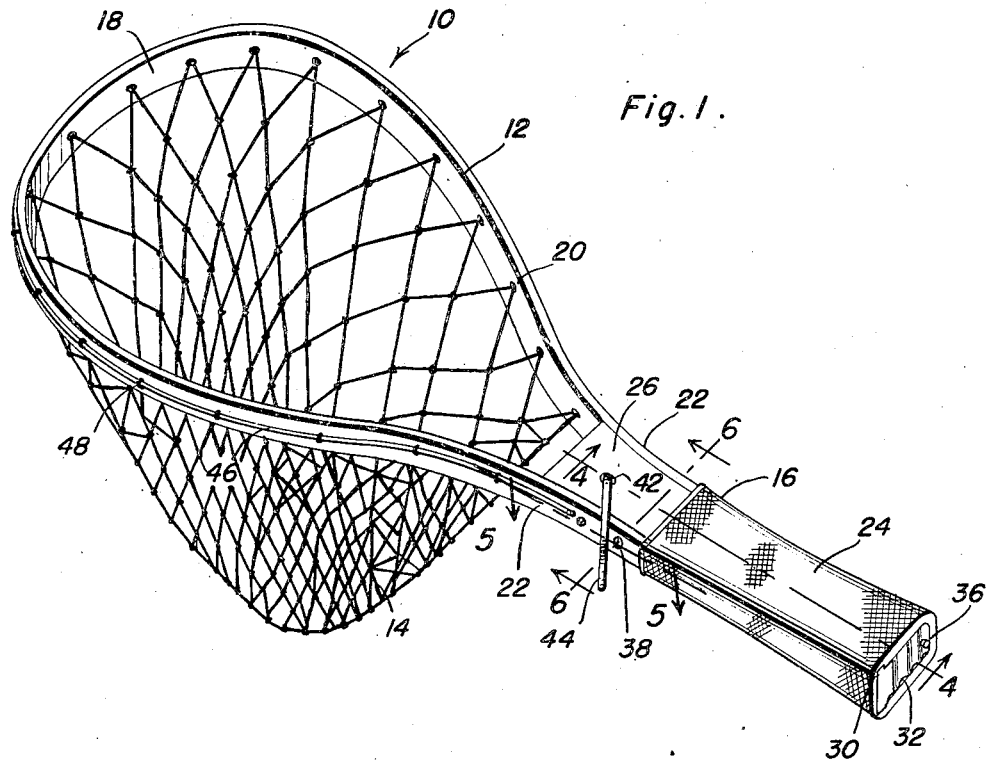
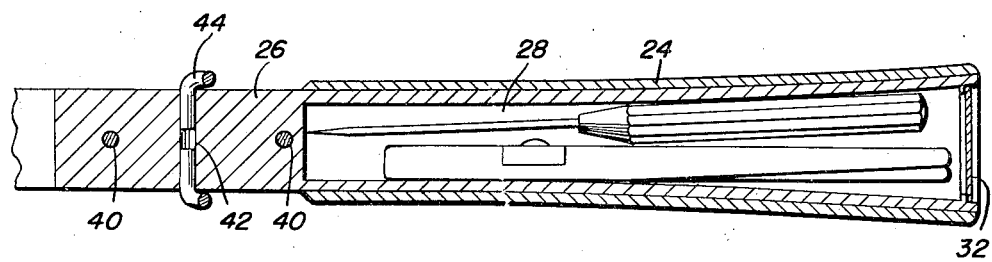
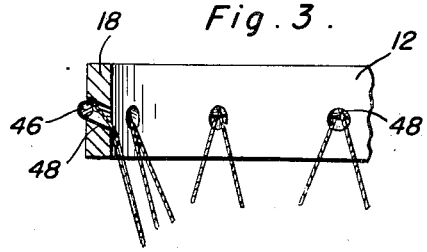
Robert E. Jennings
Howard K. Snyder
INVENTORS

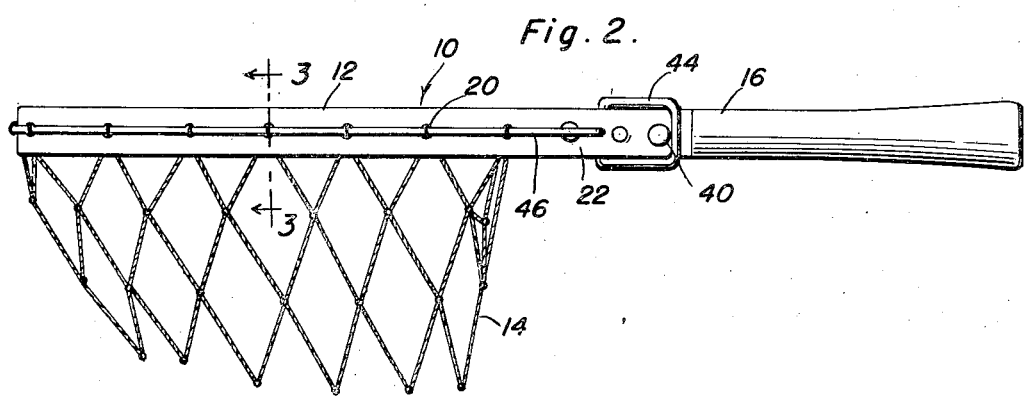
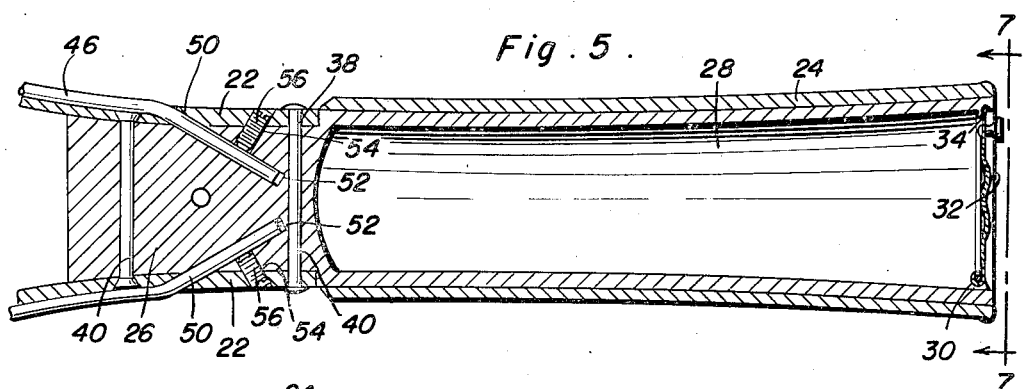
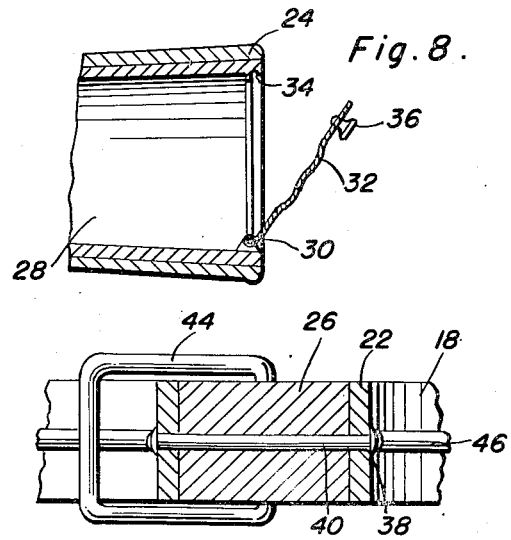
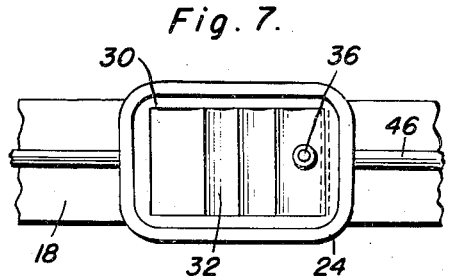

Patented Oct. 25, 1949

2,486,163

UNITED STATES PATENT OFFICE 2,486,163

DIP NET

Robert E. Jennings and Howard K. Snyder, Reno, Nev.

Application February 6, 1948, Serial No. 6,674

1 Claim. (Cl. 43—11)

This invention relates to a dip net utilizable as a fishing device and has as its primary object the provision of a light weight, corrosion resistant net which is far more durable than the conventional wooden dip net. Corrosion resistance and light weight are attained by constructing the frame and handle of aluminum, or magnesium, or their alloys. The handle may alternatively be constructed of light plastic material.

Another object of this invention is the provision of a dip net preferably having a hollow handle which serves as a tool chest, a bait box, and a first aid kit.

Yet another object of this invention is the provision of a dip net consisting of removable sections which allow for the ready assembly and disassembly of the entire net. The sections are of such construction and design that they can be rolled, extruded, machined, or cast and hence can be readily manufactured in large quantities by conventional manufacturing processes.

A still further object of this invention is the provision of a novel means of retaining the net on the light weight, metallic, corrosion resistant frame. This means includes a keeper wire which secures the net to the frame by engaging the loops of net positioned through circumferential spaced apertures carried by the frame. Thus, the keeper wire may be easily removed and the changing of the net is accomplished very quickly.

Thus, it will be readily understood that the provision of a light weight, metallic frame will permit the fisherman to use a larger dip net without unnecessary discomfiture. Also, should the frame be damaged it can easily be straightened and should it be broken it can be readily repaired by welding. Additionally, the provision of a metallic, corrosion resistant frame overcomes the usual deterioration of the net due to dampness in the wood when the conventional wooden frame is employed.

These, together with various ancillary objects and features of the invention which will later become apparent as the following description proceeds, are attained by the device, a preferred embodiment of which has been illustrated by way of example only in the accompanying drawings wherein:

Figure 1 is a perspective view of the dip net in total assembly ready for use;

Figure 2 is a side elevational view of the dip net;

Figure 3 is a fragmentary transverse vertical sectional view of a portion of the frame, net and keeper wire illustrating the manner of retaining the net on the frame;

Figure 4 is a longitudinal vertical sectional view of the handle means taken substantially on the plane of section line 4—4 of Figure 1;

Figure 5 is a fragmentary horizontal sectional view taken substantially on the plane of section line 5—5 of Figure 1;

Figure 6 is a fragmentary transverse vertical sectional view through the handle means taken substantially on the plane of section line 6—6 of Figure 1;

Figure 7 is a rear elevational view of the dip net showing the manner of attaching the door to the grip handle; and Figure 8 is a fragmentary longitudinal vertical sectional view of the grip handle with the door open.

Specific reference is now made to the drawings. In the several views in the accompanying drawings and in the following specification similar reference characters indicate corresponding elements throughout.

Generally indicated at 10 is the sectional dip net of the instant invention which consists essentially of a flexible light weight metallic frame 12, a looped net 14, and a light weight, metallic or plastic handle means 16.

The frame 12 consists of an arcuate band or bow 18 having a plurality of loop engaging apertures 20 therein and a pair of spaced arms 22 integral therewith.

The handle means 16 consists of a grip handle 24 having preferentially a knurled outer surface. The forward end of the handle means has a reduced or recessed portion 26 integral with the grip handle 24 which grip handle is preferably hollow or provided with an inner compartment 28 for receiving tools, bait or first aid equipment. Hingedly secured to the back of the hollow grip handle as at 30 is a suitable door 32, preferably crimped, which is frictionally retained in closed position by means of a slot 34. A suitable handle 36 is carried by the door for opening and closing the same.

The recessed portion 26 of the handle means 16 is removably retained to the frame 12 between the arms 22 by providing a plurality of transverse horizontal bores 38 through the arms and the recessed portion for receiving appropriate bolts 40. Also provided in the recessed portion 26 is a vertical bore 42 which receives and frictionally engages the open extremities of a conventional C-shaped catch 44 which may be metallic or elastic for securing the dip net to a fisherman's gear.

Encircling the arcuate band 18 is found a keeper wire 46 which is threaded through the loops 48 of the net 14 positioned in the apertures 20. In this manner, the net is removably retained to the metallic frame. The free extremities 50 of the keeper wire 46 are angulated and inwardly curved and are removably secured to the recessed handle portion 26 in the following manner. A pair of angulated bores 52 are provided in the recessed portion 26 for frictionally engaging the extremities 50 of the keeper wire. Substantially perpendicular to the bores 52, a pair of internally threaded bores 54 contiguous with the bores 52 are provided for receiving a pair of set screws 56 the ends of which frictionally engage the extremities 50 of the keeper wire 46.

In view of the foregoing description taken in conjunction with the accompanying drawings, it is believed that a clear understanding of the device will be quite apparent to those skilled in the art. A more detailed description is accordingly deemed unnecessary.

Having described the invention, what is claimed as new is:

A dip net comprising a looped net, a light weight corrosion-resistant metallic arcuate band having a plurality of apertures therethrough, a pair of spaced arms integral with said band, the loops of said net being positioned through the apertures provided in said arcuate band, a flexible keeper wire receivably engaging said loops and encircling said band, a corrosion-resistant light-weight handle, said handle including a grip handle on one end and a recessed portion on the other positioned between said arms, and fastening pins extending through said arms and said recessed portion, said arms and said recessed portion having registering openings for removably retaining the ends of said keeper wire in said arms and in said handle.

ROBERT E. JENNINGS.
HOWARD K. SNYDER.

REFERENCES CITED

The following references are of record in the file of this patent:

UNITED STATES PATENTS

| Number | Name | Date |
|---|---|---|
| 407,979 | Wheeler | July 30, 1889 |
| 752,550 | Heritage | Feb. 16, 1904 |
| 803,325 | Brennaaun | Oct. 31, 1905 |
| 1,478,175 | Cotey | Dec. 18, 1923 |
| 1,528,311 | Surridge | Mar. 3, 1925 |
| 2,124,952 | Norris et al. | July 26, 1938 |
| 2,220,935 | Le Compte et al. | Nov. 12, 1940 |

FOREIGN PATENTS

| Number | Country | Date |
|---|---|---|
| 13,732/33 | Australia | July 31, 1933 |
| 14,516 | Great Britain | 1885 |
| 149,603 | Great Britain | Aug. 19, 1920 |